Feb. 13, 1951     C. A. VOSSBERG, JR., ET AL     2,541,313
SIGNAL COMPARISON INDICATOR

Filed Feb. 12, 1947     2 Sheets—Sheet 1

Fig.1

INVENTORS
*Frederic Fua*
*Carl A. Vossberg Jr.*
BY
Pennie, Edmonds, Morton & Barrows
ATTORNEYS

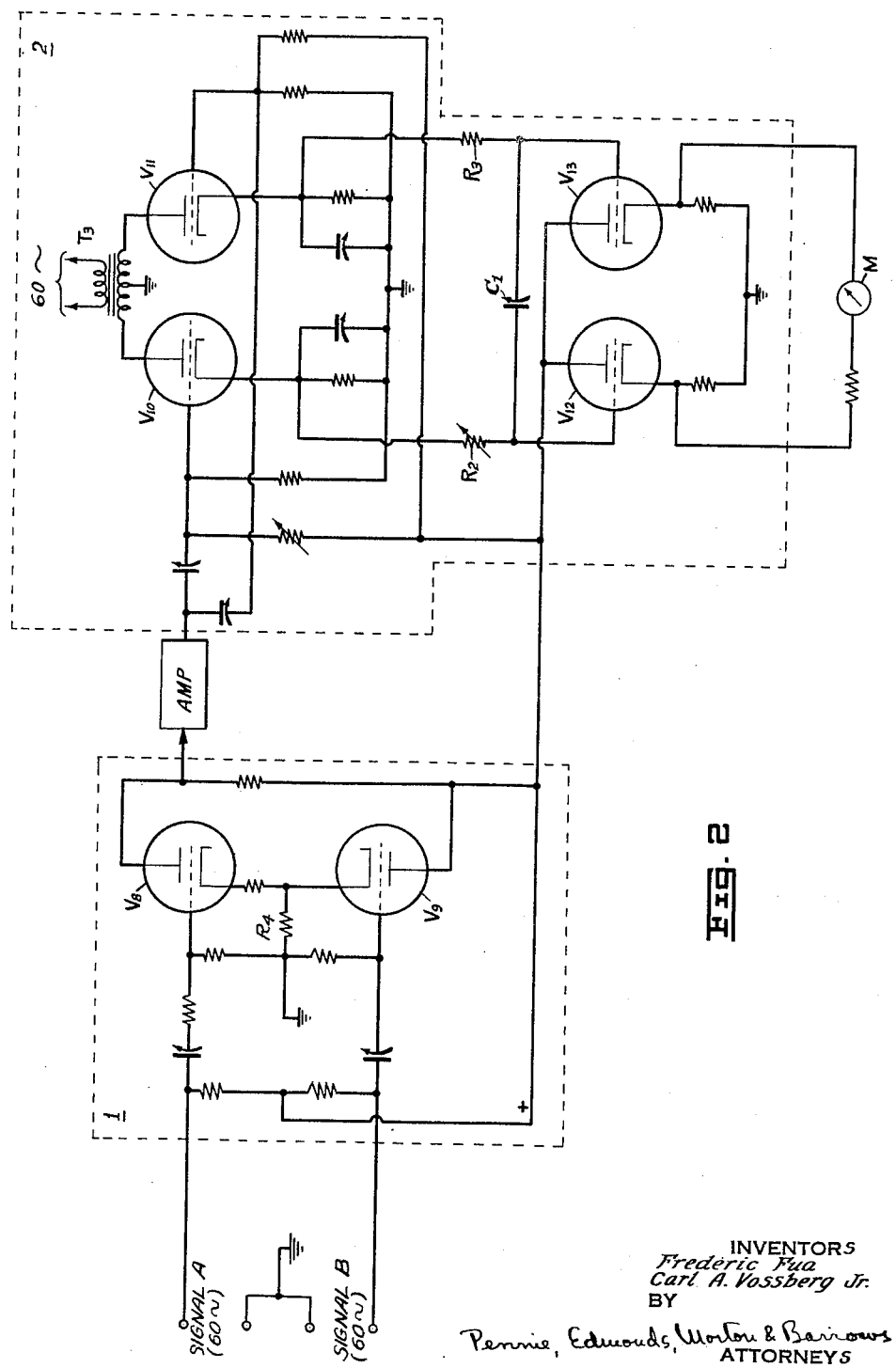

Patented Feb. 13, 1951

2,541,313

UNITED STATES PATENT OFFICE 2,541,313

SIGNAL COMPARISON INDICATOR

Carl A. Vossberg, Jr., Lynbrook, and Frederic Fua, New York, N. Y., assignors to X-Ray Electronic Corporation, New York, N. Y., a corporation of New York Application February 12, 1947, Serial No. 728,190

16 Claims. (Cl. 171—95)

1

This invention relates to a phase-sensitive indicator circuit. The word "phase" is here used to signify the instantaneous polarity of voltage and current waves of the same frequency. Since the waves under consideration are periodic their relative polarity is an indication whether they are in the same time phase or out-of-phase by 180° of their common period with respect to a reference voltage of the same frequency. Such a circuit is of especial utility in indicating the sign and magnitude of the difference between two signals of the same frequency that are being compared. As an example of apparatus in which the circuit of the present invention may be employed to advantage, the X-ray thickness gauges and concentricity meters constructed according to the Fua and Woods invention disclosed in application, Serial No. 558,928, filed October 16, 1944, now Patent No. 2,525,292, issued October 10, 1950, may be cited.

In general, the complete circuit of this invention may be said to have two principal component circuit elements.

The first such circuit element may be termed a "compositor," the input to which is the two signals of the same frequency to be compared. It is the sign and magnitude of the difference between these two signals which can be read by suitable indicating devices from the output current of the entire phase-sensitive indicator circuit comprising this invention. The output from the compositor is a single pulsating signal.

The second of these principal elements is a "discriminator." The discriminator receives as input the output of the compositor, usually after one or more stages of amplification. Especially in thickness gauge applications it is desirable that the discriminator output be so modified in relation to the compositor input signals that for equal increments of the compositor input signals, the discriminator output will have varying increments. This is accomplished by interposing before or incorporating in the discriminator the function of a signal expander. The main action of the discriminator is as a phase demodulator which receives as input the output of the compositor, which may be amplified or modified as described, and delivers a current whose sign and magnitude is dependent upon which one of the two input signals to the compositor is greater and to what degree. This current is employed to operate any suitable indicator means.

When the two signals fed into the compositor are of equal magnitude, that element will be

2 in perfect balance and the net input to the discriminator will be zero. The indicator means which is actuated by the output of the discriminator can then be set to any arbitrary starting or zero point desired. Should both signals increase in like manner, the input to the amplifier will remain zero and the indicator undisturbed. It is thus apparent that disturbances affecting both signals fed to the phase-sensitive indicator circuit to the same degree will have no influence upon the output of the circuit at balance. If, however, one of the two signals constituting the input to the compositor is greater than the other, the output of that element will be an unbalanced net signal which, passing through other elements of the whole circuit, will cause a deviation of the indicator means from the starting point, let us say a unit distance in the positive direction. If the relative magnitudes of these different input signals is exactly reversed, then the deviation of the indicator means from the starting point will again be of unit magnitude, but in the minus direction.

It may, of course, be desirable for the circuit to have a linear response to variations in the compositor input signals, but ordinarily these signals are themselves but indications of variations in other conditions in which the observer is primarily interested. For example, in the thickness gauge apparatus previously mentioned, the input signals are indications of variations in the thickness of the material being measured. It is desirable, therefore, that the final indicator response be linear to variations in the thickness of the metal, rather than linear to variations in the signal input to the compositor. It is for this purpose that a signal expander effect is obtained in the exemplary circuits illustrated in this application, thus permitting the final output readings to vary linearly with variations of the conditions of primary interest to the observer.

The circuit accomplishes this signal expansion or compression to obtain a wide variation in characteristic response by a proper choice of circuit parameters. For example, if the input signals to a circuit of this invention vary logarithmically with variations in the thickness of a material being measured by a thickness gauge which includes that circuit, the circuit characteristics determinative of the signal expander effect may be chosen to restore to its output the property of linear variations with changes in the thickness and hence may have the property of anti-logarithmic variations with changes in the output of the compositor.

Our invention is described in detail hereafter in connection with two specific circuits differing somewhat in detail from one another, but each operating in accordance with the general arrangements just described. These two circuits are illustrated in the accompanying drawings in which:

Fig. 1 illustrates a circuit employing a common balancing transformer as the compositor; and Fig. 2 indicates a circuit employing an electronic mixer.

With particular reference now to Fig. 1, the two 60-cycle input signals A and B to be compared enter the circuit via two channels each of which is grounded on one side and connected on the other side to one terminal of the primary of a transformer $T_1$. This primary winding has a tap intermediate its terminals which is substantially connected, for A. C. signals, to ground through the power supply (not shown). The signals are thus fed in voltage opposition through a common balancing transformer $T_1$. The windings of the transformer $T_1$ are so connected that its output is proportional to the algebraic sum of the signals A and B. The 120-cycle component of this output is selected by means of a 120-cycle filter and is the principal signal amplified in $V_1$. The transformer $T_1$ is enclosed in the dash-line box denominated 1 which constitutes the compositor.

Following the compositor are two tuned amplification stages comprising tubes $V_1$ and $V_2$, which may or may not be required, according to the original signal strength. The output from the second amplifier stage is delivered to the signal expander which comprises tubes $V_3$ and $V_4$ and associated components enclosed in the labeled dash-line box. In the circuit of Fig. 1, the signal expander components are separate from the discriminator components. In accordance with well known principles, the gain of tube $V_3$ is varied according to the input signal strength received by the signal expander so that an increase in this signal causes an increase in the gain of the stage. The output from the expander components is fed to the discriminator comprising the tube $V_5$ and associated components enclosed in the dash-line box numbered 3.

For the proper operation of the circuit illustrated in Fig. 1, it is necessary that tube $V_5$ be powered by a 120-cycle alternating current source whose voltage will be almost exactly in or out of phase with the signal delivered by the compositor to the discriminator. Tubes $V_6$ and $V_7$ furnish this power supply. The source of power is the conventional 60-cycle A. C. main which is in exact synchronism with the input signals A and B. This can be assured by deriving the signal energy from the same power source. The phase shifter 4, of conventional form, is provided to adjust the phase of the power supplied to the discriminator to compensate for any phase change in the input signal received by it from the compositor during its passage through that element and the amplification and expansion stages, if any. Tube $V_7$ with its associated circuit elements serves to double the frequency of the power supplied through the phase shifter, and the output of this tube, suitably tuned by L, C to the exact frequency component desired, is delivered to the plates of tube $V_5$ through the conventional power amplifier $V_6$ and transformer $T_2$.

The discriminator enclosed in the dash-line box numbered 2 operates as follows: From the power source just described, and through transformer $T_2$, the plates of tube $V_5$ are fed in opposite polarity by 120-cycle raw alternating current in synchronism with the input signals from the compositor 1. Thus, each section of the tube $V_5$ conducts on alternating half cycles. The grids are connected in parallel and hence are in the same signal phase. The half whose plate and grid voltages are in phase will conduct more current than the other half whose plate and grid voltages are out of phase. One signal phase condition will exist if signal A is greater than signal B; the opposite phase condition, if signal B is greater than signal A. Since the voltages impressed on the plates remain fixed in relation to time, one-half of tube $V_5$ will conduct more current if signal A is larger than signal B, and the other half of tube $V_5$ will conduct more current if signal B is larger than signal A. Therefore, a meter M connected as shown will indicate both the sign and the magnitude of the difference between signals A and B. By means of adjustment of resistor $R_1$ which alters the bias on one half of the tube $V_5$, the position of the indicating device on meter M can be arbitrarily set as desired to reflect the balanced condition between signals A and B.

With particular reference now to Fig. 2, the two 60-cycle input signals A and B to be compared are fed to the compositor 1 which comprises the tubes $V_8$ and $V_9$ and their associated circuit elements enclosed in the dash-line box. The signals enter the compositor via two channels, each connected on one side to ground and on the other side, via a coupling capacitor, to the grid of one of the tubes $V_8$ and $V_9$. The compositor, in this modification of the circuit of our invention, consists of an electronic mixer. Tube $V_9$ acts as a cathode follower, injecting signal B into the cathode circuit of tube $V_8$. Signal B is amplified in tube $V_9$ with a gain of less than unity and the output is developed across the cathode resistor $R_4$. The phase of signal B at the cathode of tube $V_9$ is the same as at the grid of that tube. Since $R_4$ is common to the cathode circuits of tubes $V_8$ and $V_9$, the output of $V_9$ appears in tube $V_8$ as a signal of opposite phase or polarity. Thus when the input signal B is positive a proportionate positive signal appears across $R_4$ between the cathode of $V_8$ and ground, constituting an effective negative signal on the grid of $V_8$. The net signal between grid and cathode of $V_8$ is therefore the difference between signals A and B, or the algebraic sum of A and —B, and this difference is amplified in tube $V_8$. This constitutes the output of the compositor 1. It will be observed that this signal continues at 60 cycles.

After amplification as desired, the output of the compositor 1 is fed to the discriminator 2. This element comprises the tubes $V_{10}$ and $V_{11}$ which are supplied by the transformer $T_3$ with a 60-cycle alternating current from the same source as that from which the input signals to compositor 1 was derived. Because the output from the compositor 1 is a relatively sharp pulse at a repetition rate of 60 cycles per second we can speak of pulse polarity. By proper phasing the pulse polarity at the grids of tubes $V_{10}$ and $V_{11}$ of the discriminator 2 can be made either positive or negative. With positive pulses the discriminator circuit behaves like a signal expander, that is, with equal increments of the input signal to the discriminator its output increments will increase with each step and vice versa for negative pulses. Over a range of approximately 0-15% increase of thickness in foil being gauged, for example, this expander effect inherent in the discriminator circuit of Fig. 2 is sufficient to keep the variation in meter M linear with thickness change.

The operation of tubes $V_{10}$ and $V_{11}$ in detecting the amplitude and phase of the exciting signal from compositor 1 is the same as that of tube $V_5$ in the circuit illustrated in Fig. 1. A filter comprising resistors $R_2$ and $R_3$ and capacitor $C_1$ is provided to damp out any rapid fluctuation of the discriminator output and to couple it to the indicating meter M through a current amplifier composed of tubes $V_{12}$ and $V_{13}$. $R_2$ has been made adjustable to allow for variations required by different applications.

Having thus described two embodiments of our invention in detail, what we deem as new and desire to secure by Letters Patent we define in the appended claims, in which we claim:

1. In a circuit for indicating comparatively the strength of two pulsating input signals of the same frequency, a compositor for combining the two signals into a single pulsating output signal whose phase is determined by the sign and whose magnitude is determined by the magnitude of the difference between said input signals, a discriminator for converting said compositor output signal into a current whose sign is determined by the phase and whose magnitude is determined by the magnitude of said output signal, said discriminator being adapted to compare in phase said output signal with a reference signal of the frequency of the input signals and of fixed phase relative thereto, and indicating means responsive to the magnitude and direction of flow of the said current.

2. In the circuit of claim 1, a compositor comprising a common balancing transformer receiving the two input signals in phase opposition.

3. In the circuit of claim 2, a discriminator comprising two triodes, the plates of which are fed in opposite polarity by a source of 120 cycle raw alternating current in synchronism with the output of the compositor and the grids of which are connected in parallel with said compositor output.

4. In the circuit of claim 1, a compositor comprising two triodes, each having one of the input signals impressed on its grid, one of the said triodes being connected as a cathode follower and the other of said triodes having the cathode impedance of the cathode follower connected in its own cathode circuit.

5. In the circuit of claim 4, a discriminator comprising two triodes, the plates of which are fed in opposite phase by a source of 60 cycle raw alternating current in synchronism with the input of the compositor and the grids of which are connected in parallel with the compositor output.

6. In the circuit of claim 1, a non-linear amplifier receiving as input the single pulsating output signal of the compositor and delivering its output to the discriminator.

7. In the circuit of claim 6, a signal expander proportioned to cause the output of the discriminator to vary logarithmically with variations in the input to the compositor.

8. In a circuit adapted to indicate the relative magnitude of two periodic voltages having the same period, a compositor for subtracting the instantaneous values of the said two voltages including a channel for each of the said voltages and an impedance element common to the said two channels, a frequency-selective impedance element adapted to select from the voltage developed across the said common impedance element the voltage of a selected frequency equal to a low-numbered harmonic component of the said periodic voltages, a phase-sensitive discriminator circuit adapted to detect the phase of the voltage of the said selected frequency relative to a reference voltage of frequency equal to the said selected frequency locked to the said periodic voltages and including two amplifying channels each having a vacuum tube amplifier, the plates of the said amplifiers being driven in phase opposition by the said reference voltage and the grids thereof being driven in parallel by the voltage of the said selected frequency, and an indicating means adapted to indicate the relative strength of the currents in cathode circuits of the said two amplifiers.

9. A circuit according to claim 8 in which the impedance element common to the said two channels includes the common secondary winding of a transformer, the halves of whose center-tapped primary winding are respectively connected across the said two channels.

10. A circuit according to claim 8 in which the frequency-selective impedance element presents a high impedance to the first harmonic component of the said periodic voltages.

11. In a circuit adapted to indicate the magnitude and sign of the difference between two periodic voltages having the same period, a pair of signal-conducting channels having a common conductor, a first vacuum tube amplifier in one of the said channels developing an output signal across an impedance between its cathode and the said common conductor, a second vacuum tube amplifier in the other of said channels having its cathode connected to the terminal of the said impedance remote from the said common conductor, a third and a fourth vacuum tube amplifier in which the plates are driven in opposite phase by an alternating voltage having the same period as and of fixed phase relative to the periodic voltages to be compared, a parallel connection between the output of the said second amplifier and the grids of the said third and fourth amplifiers, and indicating means adapted to indicate the relative preponderance of the currents in the cathode circuits of the said third and fourth amplifiers.

12. In the circuit of claim 1 a compositor comprising a balancing transformer to the terminals of whose primary winding the signals to be compared are applied in voltage-opposing relationship.

13. A circuit according to claim 1 in which the discriminator comprises two triodes to whose plates is applied in phase opposition a voltage of frequency equal to twice the rate of pulsation of the said input signals, the said voltage having a fixed phase relation with respect to at least one of the said input signals.

14. In a circuit for indicating the sign and magnitude of the difference between two alternating voltages of the same frequency, means to apply the said voltages in phase opposition to a common impedance, means to detect the phase of the difference voltage developed across the said common impedance relative to a reference voltage having the frequency of the voltages to be compared and of fixed phase relative thereto, said second means being further adapted to measure the magnitude of the difference voltage, and indicating means responsive to the relative phase of the difference and reference voltages and to the magnitude of the difference voltage.

15. In a circuit for indicating the sign and magnitude of the difference between two alternating voltages of the same frequency, a pair of channels, one for each of the voltages to be compared, an impedance common to the said channels across which is developed a voltage corresponding to the instantaneous difference between the voltages to be compared, the said difference voltage being itself an alternating voltage of the frequency of the voltages to be compared, a discriminator circuit in which the difference voltage is compared with a reference voltage of the frequency of the voltages to be compared and of fixed phase relative thereto, said discriminator circuit including two electron discharge devices each having a plate, a grid, and a cathode, said devices being driven in parallel on their grids by the difference voltage and in phase opposition on their plates by the reference voltage, and indicating means adapted to indicate the sign and magnitude of the difference between the currents flowing in the cathode circuits of the said devices.

16. In a circuit adapted to indicate the sign and magnitude of the difference between two periodic voltages having the same period, a compositor for continuously deriving the difference between the two said voltages, said compositor including a channel for each of the said voltages and an impedance element common to the said channels, an amplifier adapted to amplify the difference voltage so derived, a phase-sensitive discriminator circuit adapted to detect the phase of the said difference voltage relative to a reference voltage of frequency equal to that of the said two periodic voltages, said reference voltage being in fixed phase relative to the said periodic voltages, said discriminator including two amplifying channels driven in parallel on their grids by the said amplified difference voltage and in phase opposition on their plates by the said reference voltage, and an indicating means adapted to indicate the relative strength of the currents in the cathode circuits of the said two amplifying channels.

CARL A. VOSSBERG, Jr.
FREDERIC FUA.

REFERENCES CITED

The following references are of record in the file of this patent:

UNITED STATES PATENTS

| Number | Name | Date |
| --- | --- | --- |
| 1,984,545 | Peterson | Dec. 18, 1934 |
| 2,129,880 | Scherbatskoy | Sept. 13, 1938 |
| 2,176,742 | La Pierre | Oct. 17, 1939 |
| 2,323,128 | Hare | June 29, 1943 |
| 2,335,265 | Dodington | Nov. 30, 1943 |
| 2,391,532 | Wilmotte | Dec. 25, 1945 |
| 2,400,326 | Wolf | May 14, 1946 |
| 2,418,284 | Winchel et al. | Apr. 1, 1947 |
| 2,434,822 | Van Beuren et al. | Jan. 20, 1948 |
| 2,436,741 | Bussey | Feb. 24, 1948 |